United States Patent
Zhang et al.

(10) Patent No.: US 11,979,349 B2
(45) Date of Patent: May 7, 2024

(54) MOBILE NETWORK USER PLANE WITH ACCESS NETWORK USER PLANE FUNCTION

(71) Applicant: Juniper Networks, Inc., Sunnyvale, CA (US)

(72) Inventors: Zhaohui Zhang, Westford, MA (US); Constantine Dimitrios-Polychronopoulos, Saratoga, CA (US); Arda Akman, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/657,582

(22) Filed: Mar. 31, 2022

(65) Prior Publication Data
US 2023/0155762 A1    May 18, 2023

Related U.S. Application Data

(60) Provisional application No. 63/264,075, filed on Nov. 15, 2021.

(51) Int. Cl.
*H04L 5/00* (2006.01)
*H04W 8/04* (2009.01)
*H04W 28/02* (2009.01)

(52) U.S. Cl.
CPC .......... *H04L 5/0048* (2013.01); *H04L 5/0064* (2013.01); *H04W 8/04* (2013.01); *H04W 28/0263* (2013.01)

(58) Field of Classification Search
None
See application file for complete search history.

(56) References Cited

U.S. PATENT DOCUMENTS

| 11,375,527 | B1 * | 6/2022 | Eyuboglu | .......... H04B 7/15528 |
| 11,418,600 | B1 * | 8/2022 | Panem Jaya | .......... H04L 67/141 |
| 2017/0012816 | A1 * | 1/2017 | Park | .......... H04L 45/12 |
| 2019/0053117 | A1 * | 2/2019 | Bae | .......... H04W 36/125 |

(Continued)

FOREIGN PATENT DOCUMENTS

| WO | 2019078888 A1 | 4/2019 |
| WO | 2020106274 A1 | 5/2020 |

(Continued)

OTHER PUBLICATIONS

Bryant et al., "Pseudo Wire Emulation Edge-to-Edge (PWE3) Architecture," Network Working Group, RFC 3985, Mar. 2005, 40 pp.

(Continued)

*Primary Examiner* — Brandon M Renner
(74) *Attorney, Agent, or Firm* — Shumaker & Sieffert, P.A.

(57) ABSTRACT

In an example, a method comprises executing, by an access network user plane function (ANUP) for a mobile network, an access network protocol to implement a connection with a user equipment (UE); implementing, by the ANUP, based on session data received from a control plane function of a mobile core network for the mobile network, an interface with a data network; and routing or switching, by the ANUP, packets between the connection with the UE and the interface with the data network.

20 Claims, 9 Drawing Sheets

(56) References Cited

U.S. PATENT DOCUMENTS

| | | | |
|---|---|---|---|
| 2020/0107213 A1* | 4/2020 | Park | H04L 41/0806 |
| 2020/0287826 A1* | 9/2020 | Wang | H04L 12/4679 |
| 2020/0367201 A1* | 11/2020 | Cai | H04W 48/18 |
| 2023/0102552 A1* | 3/2023 | Ali | H04W 28/0273 370/329 |

FOREIGN PATENT DOCUMENTS

| | | |
|---|---|---|
| WO | 2020173137 A1 | 9/2020 |
| WO | 2020197451 A1 | 10/2020 |

OTHER PUBLICATIONS

Rosen et al., "BGP/MPLS IP Virtual Private Networks (VPNs)," Network Working Group, RFC 4364, Feb. 2006, 47 pp.

Xiao et al., "Requirements for Pseudo-Wire Emulation Edge-to-Edge (PWE3)," Network Working Group, RFC 3916, Sep. 2004, 19 pp.

Zhang, "5G Edge Cloud and Multi-access Edge Computing (MEC) Security," Juniper Networks, Retrieved from: https://blogs.juniper.net/en-us/service-provider-transformation/5g-edge-cloud-and-multi-access-edge-computing-mec-security, Dec. 17, 2020, 5 pp.

"3rd Generation Partnership Project," Technical Specification Group Services and System Aspects; System architecture for the 5G System (5GS); Stage 2 (Release 17), 3GPP TS 23.501 V17.7.0, Dec. 2022, 573 pp.

Jaffry et al., "PDU Session Establishment in 5G," medium.com, Jan. 12, 2023, 3 pp.

Matsushima et al., Segment Routing IPv6 Mobile User Plane Architecture for Distributed Mobility Management draft-mhkk-dmm-srv6mup-architecture-01, Internet Engineering Task Force, Internet—Draft, Nov. 10, 2021, 34 pp.

Matsushima et al., "Segment Routing IPV6 Mobile User Plane Architecture for Distributed Mobility Management draft-mhkk-dmm-srv6mup-architecture-04," Internet Engineering Task Force, Internet—Draft, Oct. 24, 2022, 41 pp.

Matsushima et al., "Segment Routing IPv6 Mobile User Plane Architecture for Distributed Mobility Management," draft-mhkk-dmm-srv6mup-architecture-02, Internet Engineering Task Force, Mar. 7, 2022, 17 pp.

Murakami et al., "BGP Extensions for the Mobile User Plane (MUP) SAFI draft-mpmz-bess-mup-safi-00.txt," Internet—Draft, Mar. 7, 2022, 39 pp.

Murakami et al., "BGP Extensions for the Mobile User Plane (MUP) SAFI," Internet—Draft: draft-mpmz-bess-mup-safi-02, Mar. 13, 2023, 18 pp.

Sangli et al., "BGP Extended Communities Attribute," Network Working Group, RFC 4360, Feb. 2006, 12 pp.

U.S. Appl. No. 18/343,248, filed Jun. 28, 2023, Zhang et al.

Zhang et al., "BGP Signaling for Mobile User Plane," draft-zpm-dmm-mup-bgp-signaling-00, Internet—Draft, Mar. 7, 2022, 8 pp.

Zhang et al., "Mobile User Plane Evolution draft-zzhang-dmm-mup-evolution-02," Internet-Draft, Oct. 24, 2022, 19 pp.

Response to Extended Search Report dated Dec. 14, 2022, from counterpart European Application No. 22180545.0 filed Nov. 10, 2023, 24 pp.

Extended Search Report from counterpart European Application No. 22180545.0 dated Dec. 14, 2022, 9 pp.

* cited by examiner

MOBILE NETWORK USER PLANE WITH ACCESS NETWORK USER PLANE FUNCTION

This application claims the benefit of U.S. Provisional Patent Application No. 63/264,075, filed 15 Nov. 2021, the entire contents of which is incorporated herein by reference.

TECHNICAL FIELD

The disclosure relates to computer networking and, more specifically, to mobile networks that connect to data networks.

BACKGROUND

Computer networks have become ubiquitous, and the number of network applications, network-connected devices, and types of network-connected devices are rapidly expanding. Such devices now include computers, smart phones, Internet-of-Things (IoT) devices, cars, medical devices factory equipment, etc. An end-user network-connected device typically cannot directly access a public network such as the Internet. Instead, an end-user network device establishes a network connection with an access network, and the access network communicates with a core network that is connected to one or more packet data networks (PDNs) offering services.

Mobile networks include one or more Radio Access Networks (RANs) that are access networks for 3rd Generation Partnership Project (3GPP) networks, trusted and untrusted non-3GPP networks such as Wi-Fi or WiMAX networks, and fixed/wireline networks such as Digital Subscriber Line (DSL), Passive Optical Network (PON), and cable networks. The mobile core network may be that of a mobile service provider network, such as a 3G, 4G/LTE, 5G network.

SUMMARY

In general, the disclosure describes techniques for consolidating aspects of a mobile network user plane to simplify user data exchange between a UE (user equipment) and a data network (DN) providing services to the UE. In the 3GPP 5G specifications, the user plane includes a tunnel for a N3 interface which transports user data traffic between the RAN (Radio Access Network) and the User Plane Function (UPF) in the mobile core network, and the UPF acts as a session anchor for a PDU (protocol data unit) session. Further, a UPF may connect to one or more other UPFs serially via a N9 interface. Because the 3GPP 5G specifications specify that all N3 and N9 tunnelling use GTP [GPRS (general packet radio service) Tunneling Protocol], which involves an additional encapsulation of the underlying data, elimination of the N3 tunneling would be advantageous.

In 5G mobile network systems, the N3 tunneling may be over an IP-VPN in the transport infrastructure, which is typically multi-service for both fixed and mobile networks. UPFs are commonly deployed at centralized locations in the core network, and as mentioned the N3/N9 tunnels extend the PDU layer to and among the UPFs. A UPF terminates PDU sessions to/from data networks (DNs), where each session can be a VPN over the transport infrastructure. A centralized UPF maintains per-session state [in terms of PDRs (Packet Detection Rules) and FARs (Forwarding Action Rules)] for many thousands of UEs and is typically a large system that serves many hundreds or thousands of gNodeBs (base stations). The gNodeB of the RAN connects the N3 tunnel to radio bearers implemented at base stations.

In some implementations of a 5G mobile network user plane, rather than being centralized, UPFs are distributed closer to the RAN and the mobile core network edge in such a manner that they can be co-located (i.e., in the same data center or even server) with the gNodeB of the RAN, to facilitate multi-access edge processing. In co-location examples, the N3 interface may be simplified to become a direct and/or internal connection between the gNodeB and the UPF. Because the UPF to DN connection is direct, the connection link becomes a VPN (e.g., IP VPN in the case of IP PDU session) over a transport infrastructure, most likely the same transport infrastructure for the VPN supporting the N3/N9 tunneling.

In some examples of a mobile network user plane described herein, the user plane function and at least some aspects of the gNodeB/RAN functions are consolidated into a single network function that can be deployed to support base stations. This consolidated network function is referred to herein as Access Network (and/plus) User Plane function (ANUP) to reflect that it is a combination of the access network gNodeB functions (AN functions) and the User Plane Function. Such a consolidated single network function can be implemented in future generations ("xG") of 3GPP mobile networks, wherein N3 tunneling between an access network function and a UPF is not required by 3GPP standards.

The techniques disclosed herein can provide a technical advantage over previous systems. For example, the techniques may simplify, and in some cases eliminate entirely, the N3 interface and its corresponding requirements for encapsulation, replacing it with IP-VPNs and bringing IETF (Internet Engineering Task Force) standards into the "mobile core network" where packetized transport is used, while retaining 3GPP standards for the radio links of the RAN. Various tunneling technologies compatible with VPNs may be used, including but not limited to segment routing (e.g., SRv6), and tunnels can be per-VRF (virtual routing and forwarding) or per-session. In effect, virtual private network technology achieves what was previously accomplished using the N3 tunnels (and N9 tunnels in some deployments). This contrasts with proposals by others to extend the N3 tunnels to the DNs.

In keeping with the incorporation of IP-VPNs, host routes advertised by the ANUPs to the DNs may replace per-session PDR/FAR rules and in some cases eliminate General Packet Radio Service (GPRS) Tunneling Protocol (GTP) in the mobile network protocol stack. However, the traffic pattern may remain similar to a more centralized UPF deployment if the ANUPs only maintain default routes to some hub routes in the DNs (i.e., hub-and-spoke VPN can be used to reduce host routes on most ANUPs). While there typically remain the same number of state data (per session), there may be less state measured by total amount, for host routes are lighter-weighted than GTP session data. Host routes are only needed if persistent UE addresses after re-anchoring are desired. Additional advantages may include seamless integration with wireline services, multi-access edge computing (MEC) native, and simpler Multicast and Broadcast Services (MBS)/5GLAN, and reducing operation costs due to a combined ANUP and no separate UPF management.

In one example, this disclosure describes an access network user plane function (ANUP) for a mobile network. The ANUP comprises processing circuitry and is configured to execute an access network protocol to implement a connection with a user equipment (UE); implement, based on session data received from a control plane function of a mobile core network for the mobile network, an interface with a data network; and route or switch packets between the connection with the UE and the interface with the data network.

In another example, this disclosure describes a mobile network system that includes a mobile core network with a control plane function and includes an access network user plane function (ANUP) for a mobile network. The ANUP is configured to execute an access network protocol to implement a connection with a user equipment (UE), implement, based on session data received from the control plane function of the mobile core network for the mobile network, an interface with a data network, and route or switch packets between the connection with the UE and the interface with the data network.

In another example, this disclosure describes a method that includes executing, by an access network user plane function (ANUP) for a mobile network, an access network protocol to implement a connection with a user equipment (UE); implementing, by the ANUP, based on session data received from a control plane function of a mobile core network for the mobile network, an interface with a data network; and routing or switching, by the ANUP, packets between the connection with the UE and the interface with the data network.

The details of one or more examples are set forth in the accompanying drawings and the description below. Other features, objects, and advantages will be apparent from the description, drawings, and claims.

The details of one or more examples are set forth in the accompanying drawings and the description below. Other features, objects, and advantages will be apparent from the description and drawings, and from the claims.

DETAILED DESCRIPTION

Figure 1A:
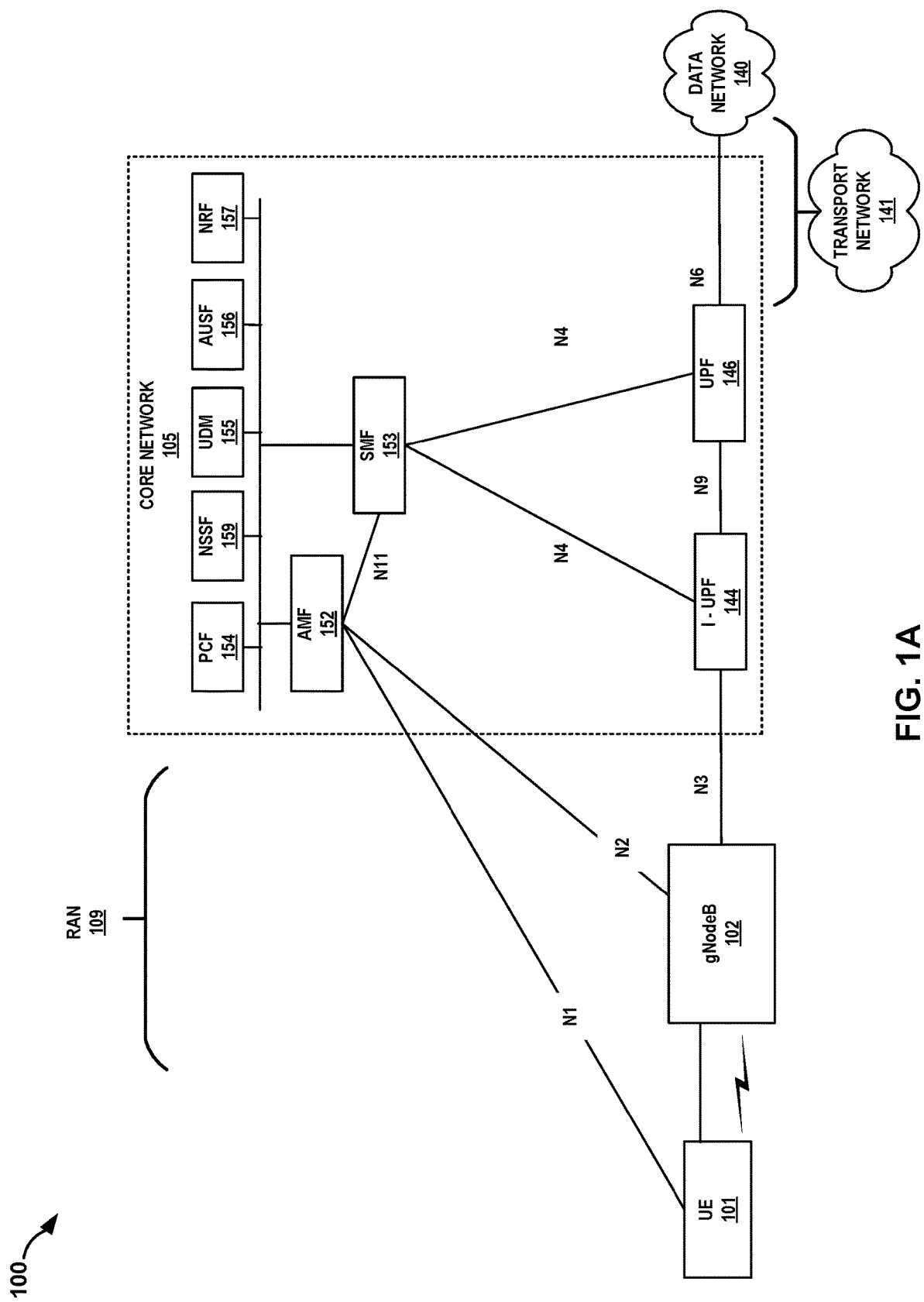
FIG. 1A is a block diagram illustrating an example 5G mobile network system.

FIG. 1A is a block diagram illustrating an example 5G mobile network system 100. The example network system 100 implements control plane user plane separation (CUPS). CUPS refers to the separation between network management (control) functions and network data traffic forwarding (user) functions. For example, control plane functions can include user connection management, route determination, QoS (Quality of Service) policy definition and enforcement, user authentication, etc. User plane functions typically include functions that forward network traffic from one node to another. Separation between the user plane functions and control plane functions can be beneficial because it can facilitate scaling of user plane functionality separately from control plane functionality.

In the example shown in FIG. 1A, components of a control plane and a user plane of mobile network system 100 conform to 5th generation mobile network ("5G") specifications as published by 3GPP. The user plane can include components that communicatively attach user equipment (UE) 101 to data network 140. In some aspects, data network 140 can be the Internet. UE 101 can be an end-user network device that communicates with other network devices via data network 140 via an operator's access network. Examples of UE 101 can be a device that communicates with data network 140 via a wireless access network such as a 3GPP network. Such devices can include smartphones, laptops, tablet computers, Internet-of-Things devices, autonomous vehicles, etc. The techniques disclosed herein are not limited to any particular type of UE 101, mobile network system, or protocol, radio access network, or network system.

Mobile network system 100 includes one or more radio access networks (RANs) 109 and mobile core network 105. In 5G mobile systems, radio access networks 109 include gNodeBs. A gNodeB is a 3GPP-compliant implementation of a 5G base station, which implements 3GPP-compliant RAN protocols, which may include PHY, Media Access Control (MAC), Radio Link Control (RLC), Packet Data Convergence Protocol (PDCP), Service Data Adaption Protocol (SDAP), Radio Resource Control (RRC), and new radio access point (NRAP). The gNodeBs 102 may include radio units (RUs) located at various cellular network sites ("cell sites"), along with distributed units (DUs) and centralized units (CUs). The 5G RU is hardware-based for the user data plane and each RU consists of an LO PHY and a RF transmitter. The LO PHY component may be implemented using specialized hardware for high-performance packet processing. DUs and CUs are typically implemented as Network Functions (NFs), also referred to herein as Access Network functions (AN functions).

RUs connect to DUs via a fronthaul network. The fronthaul network connects LO PHY and HI PHY and is used by RUs and DUs to implement the F2 interface of 5G. DUs manage the packet transmission of radio by the RUs. In some cases, such packet transmission conforms to the Common Packet Radio Interface (CPRI) and/or to the enhanced CPRI (eCPRI) standard, or to IEEE 1914.3. DUs may implement the RLC, MAC, and the HI PHY layer. DUs are at least partially controlled by CUs.

DUs connect to CUs via the midhaul network, which may be used by DUs and CUs to implement the F1 interface of 5G. CUs may implement the RRC and PDCP layers. CUs connect to mobile core network 105 via a backhaul network. The midhaul and backhaul networks may each be wide area networks (WANs).

In some examples of radio access networks 109 of mobile network system 100, gNodeBs 102 includes one of CUs and one of DUs. A CU may support multiple DUs to implement multiple gNodeBs. One or more RUs may be supported by a single DU.

Any DU may or may not be located at the cell site that includes the RU(s) supported by the DU. A DU may be located at a cell site, while other DUs may be located at a local data center and collectively support multiple RUs. Mobile network system 100 may have radio access networks 109 that include many thousands of cell sites and gNodeBs.

Radio access networks 109 connect to mobile core network 105 to exchange packets with data network 140. Mobile core network 105 may be a 5G core network, and data network (DN) 140 may represent, for example, one or more service provider networks and services, the Internet, $3^{rd}$ party services, one or more IP-VPNs, an IP-multimedia subsystem, a combination thereof, or other networks or combination of networks.

Core network 105 as implemented in 5G is a service-based architecture that includes various interconnected cloud-native network functions (NFs) having authorization to access each other's services. As illustrated, mobile network system 100 includes core network 105 that implements various discrete control plane functions for network system 100. In some aspects, core network 105 includes 5G control plane functions (network functions) such as Access Mobility Management Function (AMF) 152, Session Management Function (SMF) 153, Policy Control Function (PCF) 154, User Data Management (UDM) 155, Network Repository Function (NRF) 157, Authentication Server Function (AUSF) 156, and Network Slice Selection Function (NSSF) 159.

AMF 152 communicates with UE 101 via an N1 control interface. AMF 152 can also attach to an access network function such as a DU/CU via an N2 interface. The AMF receives all connection and session related information from the UE via the N1/N2 interfaces but is responsible only for handling connection and mobility management tasks. All messages related to session management are forwarded over the N11 interface to the SMF. SMF 153 communicates with I-UPF 144 and UPF 146 using an N4 interface. The SMF 153 handles session management, IP address allocation, and control of policy enforcement. AMF 152, SMF 153, PCF 154, UDM 155, NRF 157, AUSF 156 and NSSF 159 are incorporated along with other network functions and services in core network 105. Further details on services and functions provided by AMF 152, SMF 153, PCF 154, UDM 155, NRF 157, AUSF 156 and NSSF 159 can be found in $3^{rd}$ Generation Partnership Project 2021, *Technical Specification Group Services and System Aspects; System architecture for the 5G System (5GS); Stage 2 (Release 17)*, TS 23.501 V17.0.0 (2021-03), the entire contents of which is hereby incorporated by reference.

The user plane function (UPF) in 5G is responsible for packet routing and forwarding, under the control of the SMF. A UPF generates charging data records and traffic usage records which are sent to the SMF and can perform packet inspections and apply policies. The N3 interface extends from gNodeB 102 to the Protocol Data Unit (PDU) Session Anchor (PSA) UPF (UPF 146 for UE 101 in FIG. 1A), though I-UPFs 144 may intermediate traffic between gNodeB and the PSA UPF. In such cases, the N9 interface is used between the I-UPF 144 and the PSA UPF 146, as shown in the example of FIG. 1A.

Figure 1B:
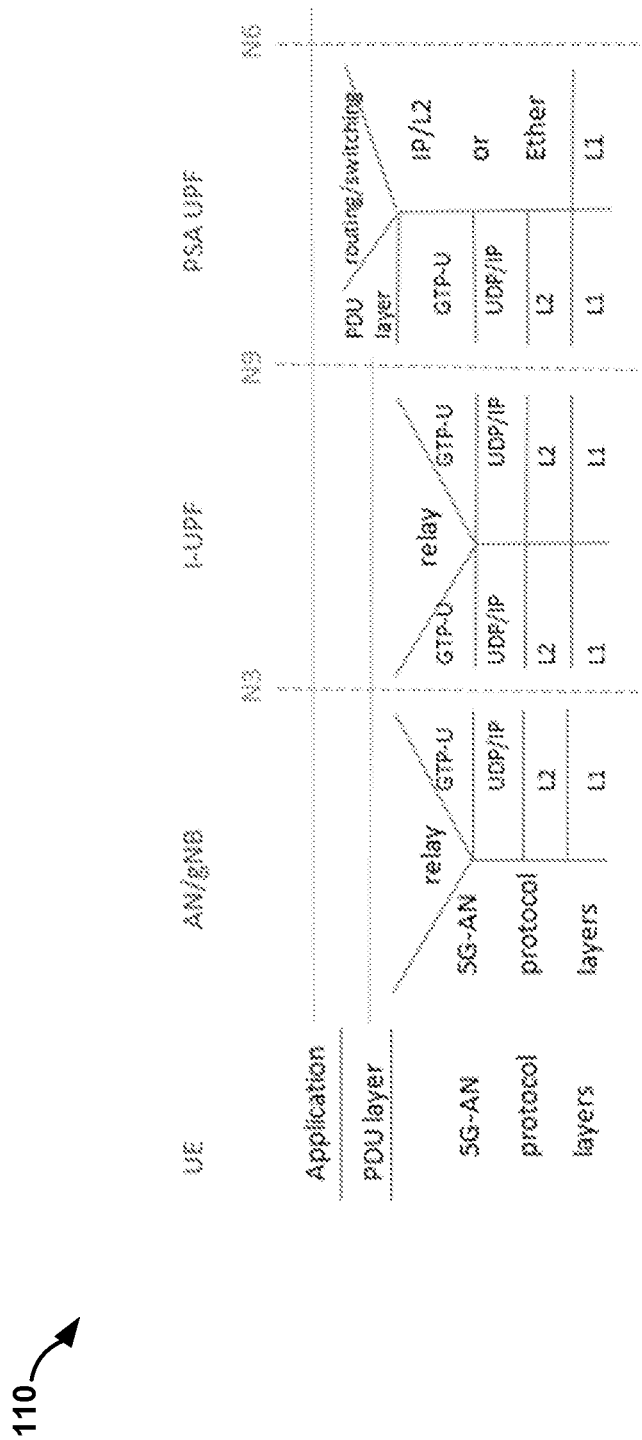
FIG. 1B depicts a mixed system and protocol diagram for the user plane of an example 5G mobile network system.

FIG. 1B depicts a mixed system and protocol diagram 110 for the user plane of example 5G mobile network system 100 of FIG. 1A. UPFs are commonly deployed at central locations and the N3/N9 tunnels extend the PDU layer from the gNodeBs to and among the UPFs. At the gNodeB 102, relay/stitching is used to connect the Service Data Adaption Protocol (SDAP) layer and the N3 interface. At I-UPF 144, relay/stitching is used to connect N3 and N9. The PSA UPF terminates the N3 or N9 tunnel and performs routing/switching (at L3/L2 level respectively) between UE 101 (over the PDU session) and data network 140.

The N3 and N9 interface are GTP-U tunnels that are typically transported using a virtual private network (VPN) implemented over a transport network 141 infrastructure. GTP-U stands for GPRS (General Packet Radio Service) Tunneling Protocol. In other words, GTP-U is used for carrying user data within the core network 105 and between the radio access network and the core network 105. The user data transported can be packets in any of IPv4, IPv6, or PPP formats. Transport network 141 may represent a Mobile Network Operator (MNO) network and may include infrastructure in common with core network 105.

User data between the core network 105 and a network such as transport network 141/data network 140 uses a N6 interface. While N6 is a 3GPP-defined interface, it is merely for reference—there is no tunneling or specification involved. The N6 interface is simply a direct IP (in case of IP PDU session) or Ethernet (in case of Ethernet PDU session) connection with data network 140.

Figure 2:
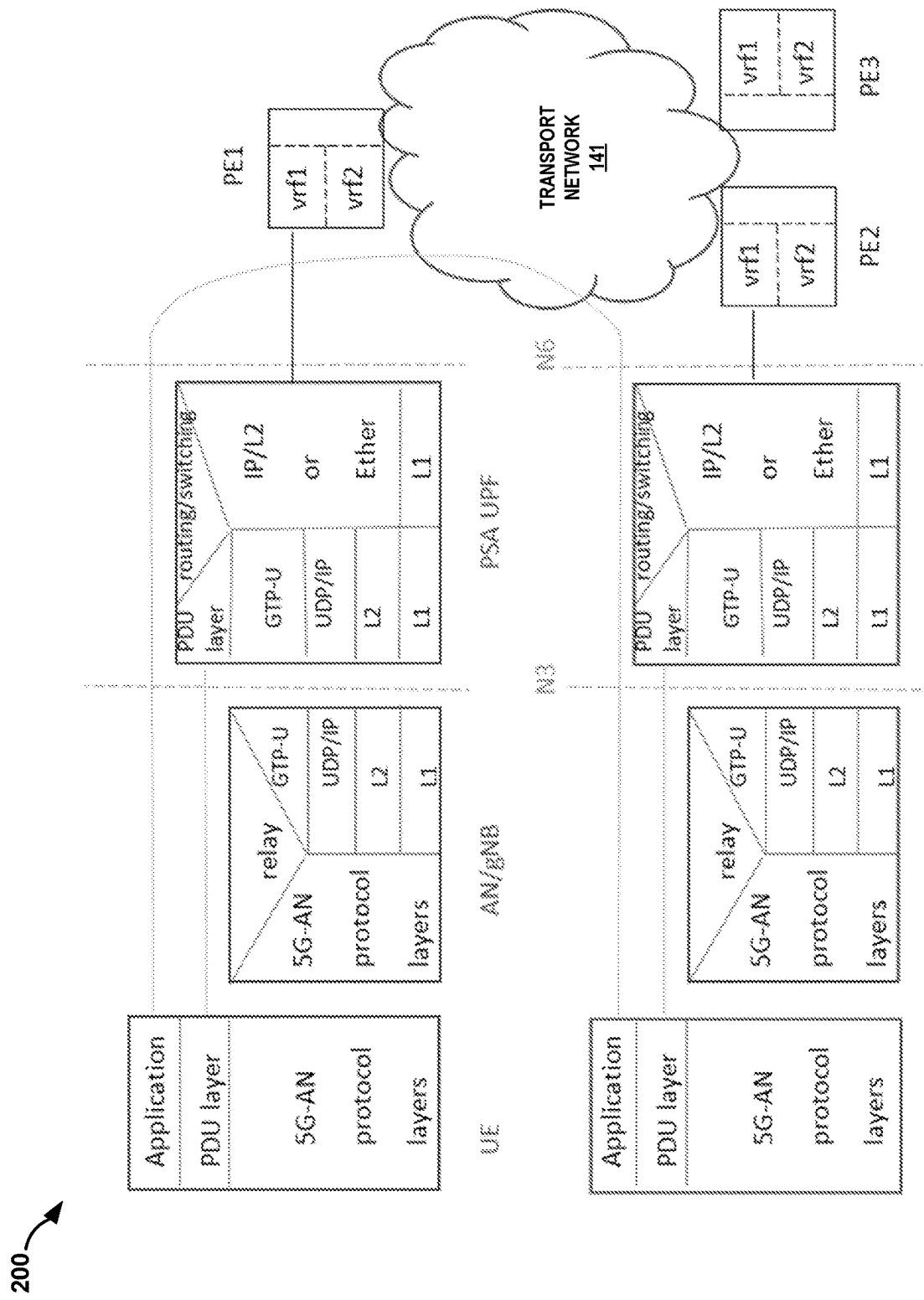
FIG. 2 depicts a mixed system and protocol diagram for the user plane of an example 5G mobile network system having distributed UPFs.

FIG. 2 depicts a mixed system and protocol diagram 210 for the user plane of a 5G mobile network system having distributed UPFs. In this case, there is no N9 interface and the PSA UPFs 146 interface with gNodeBs via an N3 interface. In other words, a centralized PSA UPF is no longer needed in the deployment shown in FIG. 2. Rather, a UE may have its session anchor migrate among multiple UPFs distributed in the mobile core network, for example at the access edge. In this example, multiple UPFs 146 are connected to the same data network that is instantiated as a VPN configured in transport network 141 having provider edge (PE) routers PE1, PE2, and PE3. Each of the PE1, PE2, and PE3 has configured thereon virtual routing and forwarding instances (VRFs) (vrf1 and vrf2) for respective IP VPNs. IP VPNs are described in further detail in "BGP/MPLS IP Virtual Private Networks (VPNs)," Internet Engineering Task Force Network Working Group, Request for Comments 4364, February 2006, which is incorporated by reference herein in its entirety.

The example deployment in FIG. 2 may be a common deployment that facilitates multi-access edge computing (MEC), formerly known as mobile edge computing. Edge cloud is an evolution of cloud computing, which enables application hosting and data processing to move from centralized data centers to the network edge. Cloud capabilities are distributed across the network, which is particularly helpful for applications that need low-latency and/or high-bandwidth.

ETSI has defined a set of technical standards for Multi-Access Edge Computing (MEC) with the objective of enabling an open ecosystem for service providers and third parties to flexibly and rapidly deploy applications with real-time access to radio network information for optimization. It is generally agreed that MEC is one of the key enabling technologies for 5G, particularly for its ability to flexibly offload traffic through the UPF and its open environment for enabling diverse vertical apps and services.

With MEC, more UPFs are distributed closer to gNodeBs. In that case, the N3 interface becomes very simple—over a direct or short transport connection between, e.g., gNodeB 102 and UPF 146 or even an internal connection if gNodeB 102 and UPF 146 are hosted on the same server. On the other hand, since the UPF 146 to data network 140 connection is direct, the data network becomes a VPN (e.g., IP VPN in case of IP PDU sessions) over a transport infrastructure, most likely the same transport infrastructure for the VPN supporting the N3/N9 tunneling.

Thus, with distributed UPFs in a 5G network, as shown in FIG. 2 where the transport network infrastructure has elements in common with data network 140, data network 140 providing data packet services to UE can be an IP-VPN corresponding to any of vrf1 and vrf2.

VPN standards are defined in RFC 4364 and other IETF standards and have been widely deployed in wireline networks. In FIG. 2, the UPFs act as Customer Edge devices (CEs) connected to the PEs. In FIG. 2, PE3's VRFs could, for instance, connect to VPN sites on wireline side, including the internet.

FIG. 2 illustrates two PSA UPFs and two access network/gNodeBs. If it is necessary for a UE to maintain a persistent IP address as it is re-anchored to different distributed UPFs, a UPF that is anchoring may announce IP host routes (e.g., /32 routes) with the persistent IP address for the UE. Once such a UE de-anchors for a UPF, the UPF may withdraw the host route.

Figure 3A:
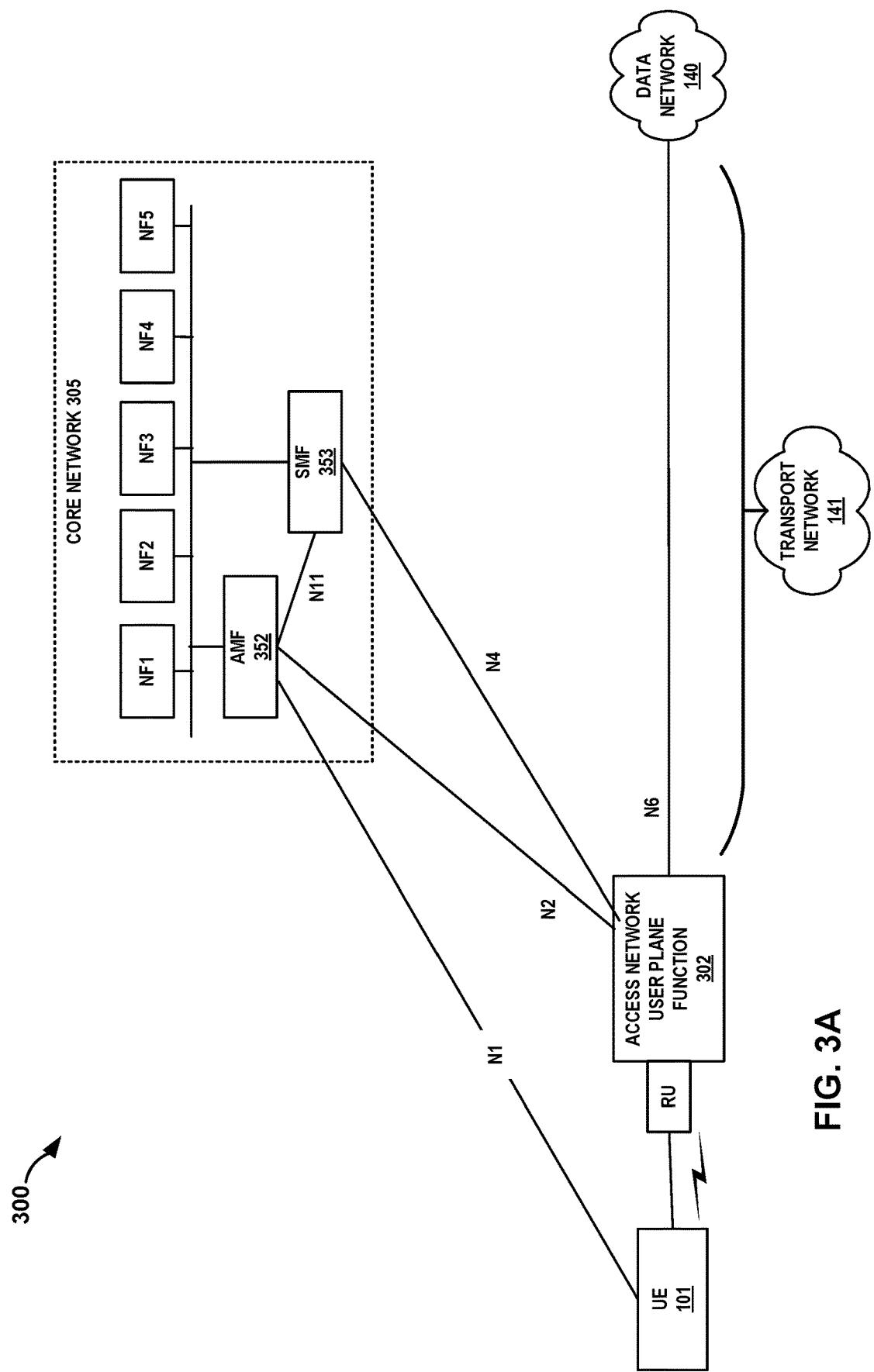
FIG. 3A is a block diagram illustrating an example xG mobile network system having a mobile network in which an access network user plane function (ANUP) implements a combined access network/gNodeB and User Plane Function, according to techniques of this disclosure.

FIG. 3A is a block diagram illustrating a mobile network system 300 having a radio access network in which access network user plane function (ANUP) 302 implements combined access network functions and User Plane Function. As shown in FIG. 3A, a UE 101 connects via an over the air radio connection to an RU, which communicates with the ANUP 302. ANUP 302 may be implemented by one or more servers, appliances or other physical network functions, or other computing devices. ANUP 302 terminates a PDU session with UE 101 and also has an N6 interface with data network 140. Transport network 141 may include one or more PE routers, P routers, switches, and other network devices to implement an IP and/or L2 layer to transport IP and/or Ethernet packets among different instances of ANUPs between end-user applications operating on UEs and between ANUPs 302 and data network 140 services. Transport network 141 and a data network 140 may have at least some common infrastructure. Data network 140 may represent an IP VPN or other Layer 3 VPN, the internet, cloud service provider network, an IP Multimedia Subsystem (IMS), or other data network or packet data network (PDN).

The ANUP 302 communicates with various network functions (illustrated as NF1, NF2, NF3, etc.) of core network 305. In the illustrated example, AMF 352 and SMF 353 have interfaces N2 and N4, respectively, with ANUP 302 for the different functions, which could be like those of an example 5G network, as described with respect to FIG. 1A. In some examples, core network 305 may include other or different network functions or combinations of functions. For example, AMF/SMF may also be combined into a single function and N2/N4 combined into a common interface.

Figure 3B:
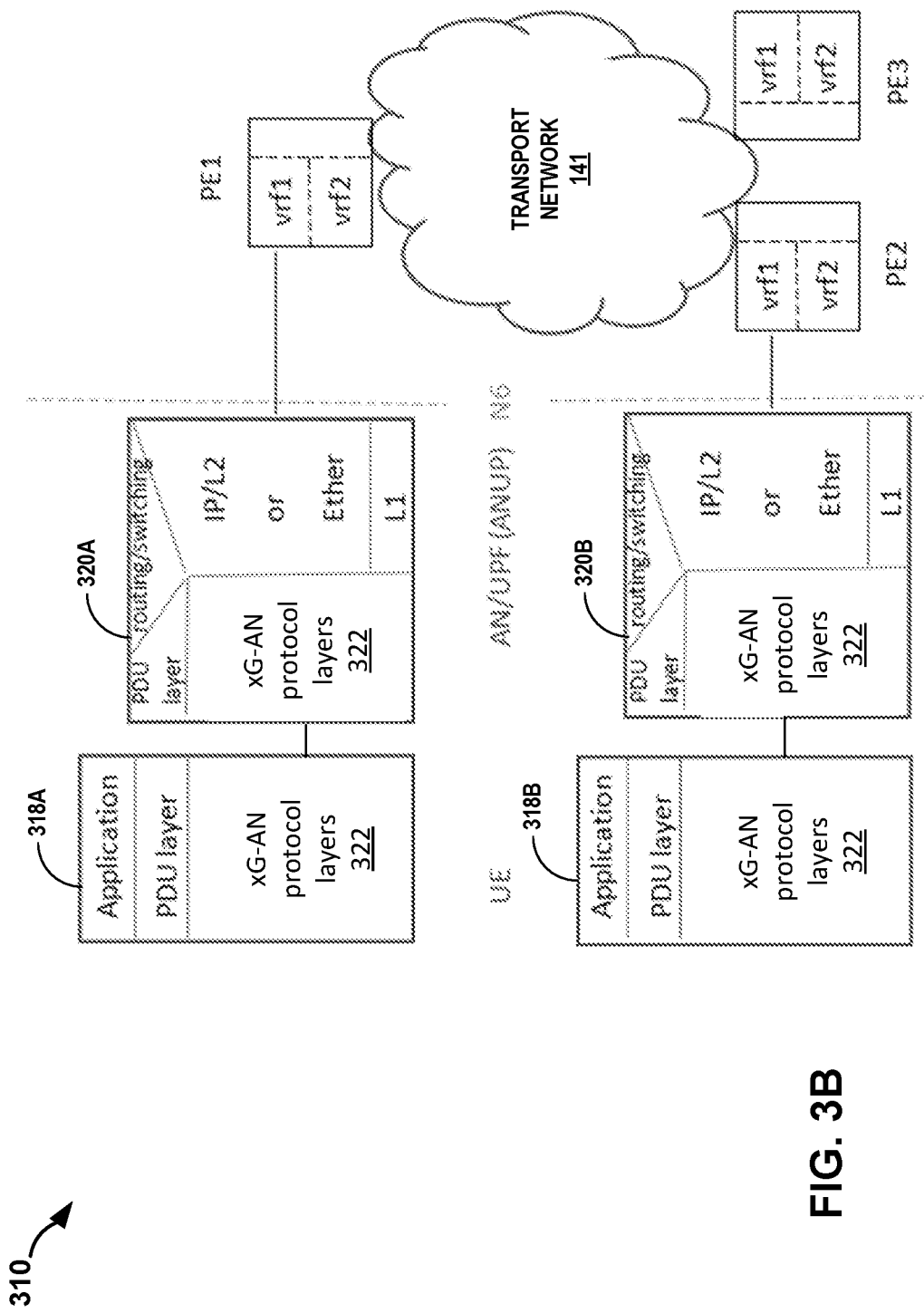
FIG. 3B depicts a mixed system and protocol diagram for the user plane of an example xG mobile network system that may be considered a further evolution of the distributed UPF deployment and implementation of a mobile network system as depicted in FIG. 2, according to techniques of this disclosure.

FIG. 3B depicts a mixed system and protocol diagram 310 for an example instance of at least a portion of mobile network system 300 shown in FIG. 3A, and which may be considered a further evolution of the distributed UPF deployment and implementation of a mobile network having distributed UPFs (with protocol layers depicted in FIG. 2), according to techniques of this disclosure. UEs 318A-318B (collectively, "UEs 318") are example instances of user equipment. In FIG. 3A, the UPF and access network functions are integrated into the access network user plane function (ANUPs) 320A-320B (collectively, "ANUPs 320"), each of which may represent an example instance of ANUP 302 of FIG. 3A. Each of ANUPs 320 executes access network protocols for the generation of 3GPP mobile network in which the ANUP is deployed. This may be 6G, 7G, and so on, and for this reason the protocol layers are illustrated and referred to herein as xG-AN protocol layers 322. xG-AN protocol layers 322 may implement any one or more of the 3GPP-compliant RAN protocols listed above, i.e., PHY, MAC, RLC, PDCP, SDAP, RRC, or NRAP that are defined for 5G. xG-AN protocol layers 322 may include other access network protocol layers, newly defined for an xG mobile network, to support a PDU layer between UEs 318 and ANUPs 320 for UE connections. xG-AN protocol layers 322 may support RAN protocols.

Protocol data unit (PDU) sessions terminate on the ANUPs 320, which perform routing/switching between the two stacks (the PDU/xG-AN stack (3GPP) and the IP/L2 stack (IETF)). Although N6 interface is illustrated in FIG. 3B, N6 interface may be eliminated, renamed, or considered merely for reference in xG.

In this flattened architecture, IETF and 3GPP technologies are applied where they are best applicable—3GPP for the radio access network and IETF for the rest, e.g., transport network and data network. As IETF technologies continue to evolve, they can be automatically applied in mobile networks without any changes in 3GPP architecture/specification. For example:

Any kind of tunnels can be used, such as MPLS or SRv6, which may avoid the overhead of UDP/GTP encapsulation as in 3GPP networks on the N3/N9 interfaces. Network slicing function is supported (the transport network needs to instantiate the slices for N3/N9 tunnels as well).

5G-LAN and MEC become native applications (PDU sessions terminate into the closest ANUP and are routed/switched to different data networks).

Multicast and Broadcast Services (MBS) becomes very simple—the ANUP gets the multicast traffic from the DN and may then use either a shared radio bearer or individual bearers to send to interested UEs.

In some examples, because ANUPs 320 implements the routing/switching functions, one or more of the PE functions could be optionally integrated into the ANUPs 320, further optimizing end-to-end communications by reducing NFs and connections between them. In fact, the current 5G gNodeB N3 tunneling function is similar to pseudowire (PW) PE function, as described in further detail below.

The compressed user plane architecture techniques described herein may be used in further iterations of 3GPP standards, such as 6G/7G/xG (designated herein as "xG" network systems) with an integrated AN/UP NF (ANUP) that optionally provides the VPN function. The techniques make significant use of the IETF/wireline technologies and provide integrated services for both wireline/fixed and wireless/mobile customers. At least in some examples, the techniques may not require changes in the control plane, though the control plane may be optimized for the compressed user plane.

The following sub-sections describe how some existing functionalities are supported with the new architecture.

Handover

For IP PDU sessions, a UE may be assigned different IP addresses each time it anchors at a different UPF if session continuation is not an issue (e.g., the applications may be able to deal with changing addresses). For this situation, no special handling is needed.

If needed, persistent IP addresses may be assigned even when UEs move from one ANUP to another. To handle mobility and handover, each ANUP announces host routes for UEs anchored to itself. When a UE de-anchors from an ANUP, that ANUP withdraws the host route.

For example, if a UE moves from ANUP2 to ANUP1, originally, ANUP2 advertises the UE address. After the UE moves to ANUP1, ANUP1 advertises the UE address and ANUP2 withdraws the route. Traffic from the DN to the UE is sent (in the DN) to ANUP1, who then routes to the UE. There could be inflight traffic that was sent (in the DN) towards ANUP2. Any node in the path (include ANUP2 itself) would redirect the traffic to ANUP1 as soon as the host route advertised from ANUP1 becomes the active route on that node.

An ANUP may retain host routes advertised by other ANUPs. In that case, UE to UE traffic will take the short ANUP-ANUP path. It could also be that an ANUP only maintains host routes that it advertises and a default route to a hub router on the DN. That way, UE to UE/internet traffic may go through the hub. Notice that from traffic path point of view, this is similar to 5G central UPF scenario (the central UPF corresponds to the hub router in the new user plane architecture), except that in 5G case traffic is sent over N3 tunnel to/from the central UPF while in the new architecture the traffic is routed to/from the hub router (in a VPN). Additionally, while the hub router needs to maintain all host routes, the number of host routes are directly comparable to the number of per-session state (PDRs/FARs) that a 5G UPF maintains.

For the same reason, maintaining the host routes inside the DN is similar to maintaining the per-session state in the 5G case. Even if the DN is "Internet" (e.g. the UE is a "consumer" UE and not a "business" UE that accesses a company intranet), the host routes are not advertised to the public internet. The host routes are instead confined to the internal part of the "internet access network" of the operator.

Note that the above for IP PDU session in the new architecture is very similar to the Ethernet PDU sessions— even in 5G (switching is based on individual "host" mac addresses and the mac address will not change when a UE moves from one ANUP to another).

Lawful Intercept, Accounting, etc.

These functions are merged into the ANUP and may continue to work similarly as in 5G systems.

Per-Flow QoS

If the traffic to/from a UE is from/to another UE on the same anchoring ANUP, all QoS related handling need only involve that ANUP.

Otherwise, the traffic needs to go through another ANUP or hub router over VPN underlay tunnels.

QoS marking is done in the VPN tunnel encapsulation.
For comparison, in case of N3 tunneling, QoS marking is done both in the IP/UDP header and the GTP header.
Traffic shaping can be done at two levels:
a. On the radio link by the ANUP
b. On the hub→ANUP tunnel by the hub to prevent an ANUP being overwhelmed by from-internet traffic. This can be done at the per-session (host route) level—just as in the 5G case it can be done at per-session (N3 tunnel) level. The QoS parameters (as learned via N4 signaling) can be advertised by the PSA UPF along with the host routes so there is no need for modification or additional requirements imposed to AMF/PCF/other core functions.
While it is most likely not needed on the ANUP→ANUP/ hub tunnel, traffic shaping can be done at per-session (host route) level by the source ANUP as well.

Security

Encryption between UE and ANUP may be similar or the same as between UE and gNodeBs in 5G. Previous encryption between gNB and UPF is no longer needed because they are now a single entity. ANUP-ANUP/hub encryption can be done as with existing VPN deployment (though if the transport infrastructure is already secure then there is no requirements for security at VPN level).

There are cases where separate AN and UP functions may be desired. For example, home routed roaming (where subscribers access a visited network via its RAN but receive services provided by their home networks) require separate HPLMN UPFs and VPLMN ANs. In another example, an MNO (mobile network operator) may want to deploy one UPF for a cluster of access networks in proximity in some locations. Further, an MNO may support VMNOs (virtual mobile network operators) who have their own UP functions but make use of the hosting MNO's access networks. In these examples, tunneling is required between ANs and UPs. In such cases, the tunneling can be achieved via IEFT's pseudo wire technology as described below.

Home Routed Roaming

Figure 4:
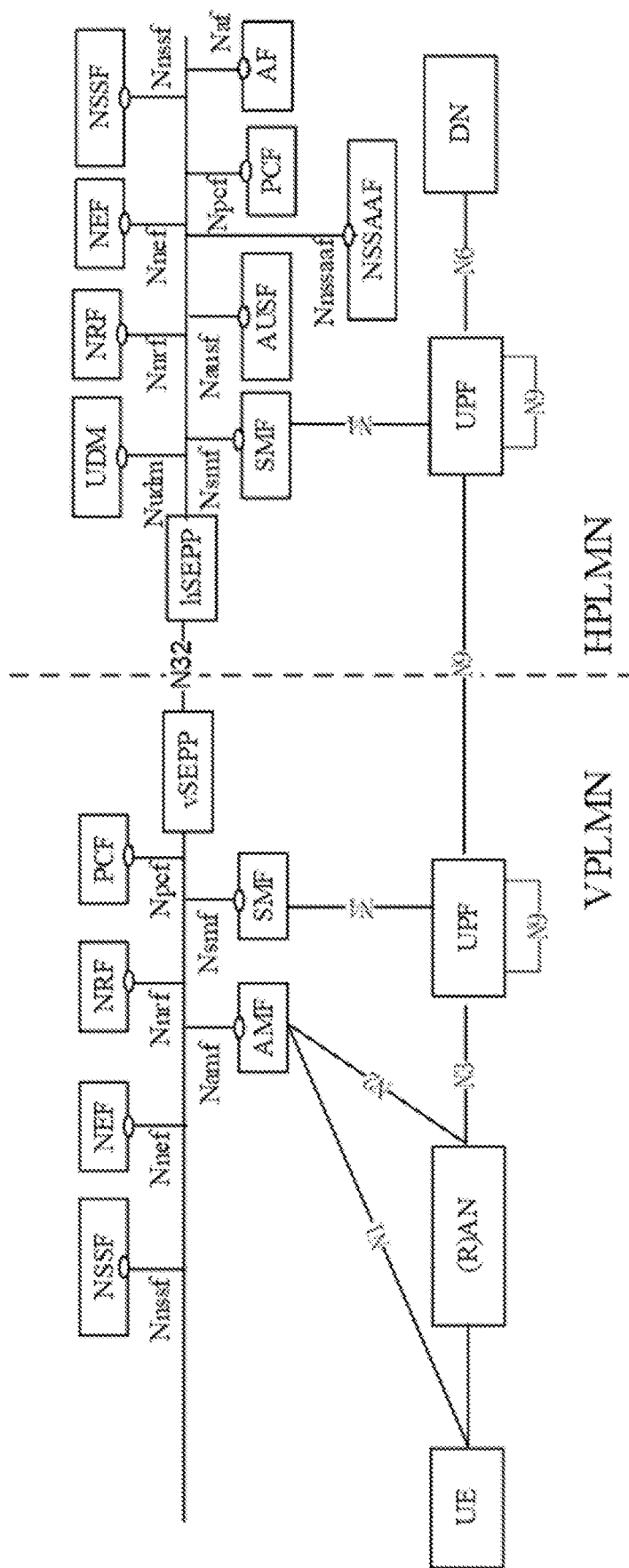
FIG. 4 depicts network functions and interfaces for Public Land Mobile Networks (PLMNs) including a VPLMN (Visited PLMN) and an HPLMN (Home PLMN).

With respect to roaming, local breakout (LBO)-based roaming can be naturally supported in the new architecture, in that the AN and UP functions remain in the visitor network. However, with Home Routed roaming in 5G, the N3 tunnel from the visitor network (VPLMN) extends to N9 and terminates in the UPF in the home network (HPLMN), as depicted in FIG. 4.

In an architecture implemented and deployed in accordance with techniques described herein, while a UPF can terminate non-roaming UE's PDU session, the UPF cannot terminate a home-routed roaming UE's PDU session—the PDU session needs to be extended to a UPF in the Home Public Land Mobile Network (HPLMN). That can be done via mature Pseudo Wire technology defined in IETF as explained below. Pseudo Wires are described in "Pseudo Wire Emulation Edge-to-Edge (PWE3) Architecture," Internet Engineering Task Force, Request for Comments 3985, March 2005, which is incorporated by reference herein in its entirety.

Request for Comments (RFC) 3985 describes:
This document an architecture for Pseudo Wire Emulation Edge-to-Edge (PWE3) in support of [RFC3916]. It discusses the emulation of services such as Frame Relay, ATM, Ethernet, TDM, and SONET/SDH over packet switched networks (PSNs) using IP or MPLS. It presents the architectural framework for pseudo wires (PWs), defines terminology, and specifies the various protocol elements and their functions.
. . .
PWs provide the following functions in order to emulate the behavior and characteristics of the native service.
Encapsulation of service-specific PDUs or circuit data arriving at the PE-bound port (logical or physical).
Carriage of the encapsulated data across a PSN tunnel.
Establishment of the PW, including the exchange and/ or distribution of the PW identifiers used by the PSN tunnel endpoints.

Managing the signaling, timing, order, or other aspects of the service at the boundaries of the PW.

Service-specific status and alarm management.

. . .

The payload is classified into the following generic types of native data units:

Packet

Cell

Bit stream

Structured bit stream

Within these generic types there are specific service types:

| Generic Payload Type | PW Service |
|---|---|
| Packet | Ethernet (all types), HDLC framing, Frame Relay, ATM AAL5 PDU. |
| Cell | ATM. |
| Bit stream | Unstructured E1, T1, E3, T3. |
| Structured bit stream | SONET/SDH (e.g., SPE, VT, NxDS0). |

When applied to extend the Home Routed roaming PDU session to the HPLMN, the payload type is "Packet"—IP packet or Ethernet frame (that is, the layer over the SDAP layer between UE and local gNodeB) for IP or Ethernet PDU session, respectively. In the case of an Unstructured PDU session type, the PW payload type would be "Bit stream".

Figure 5:
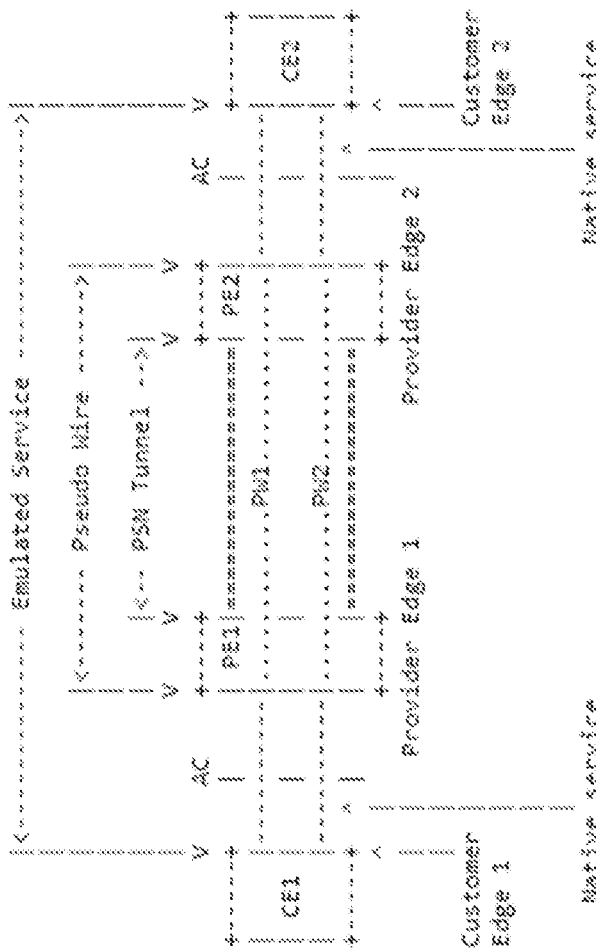
FIG. 5 depicts the Network Reference Model for Pseudo Wire (PW) Emulation.
Figure 6:
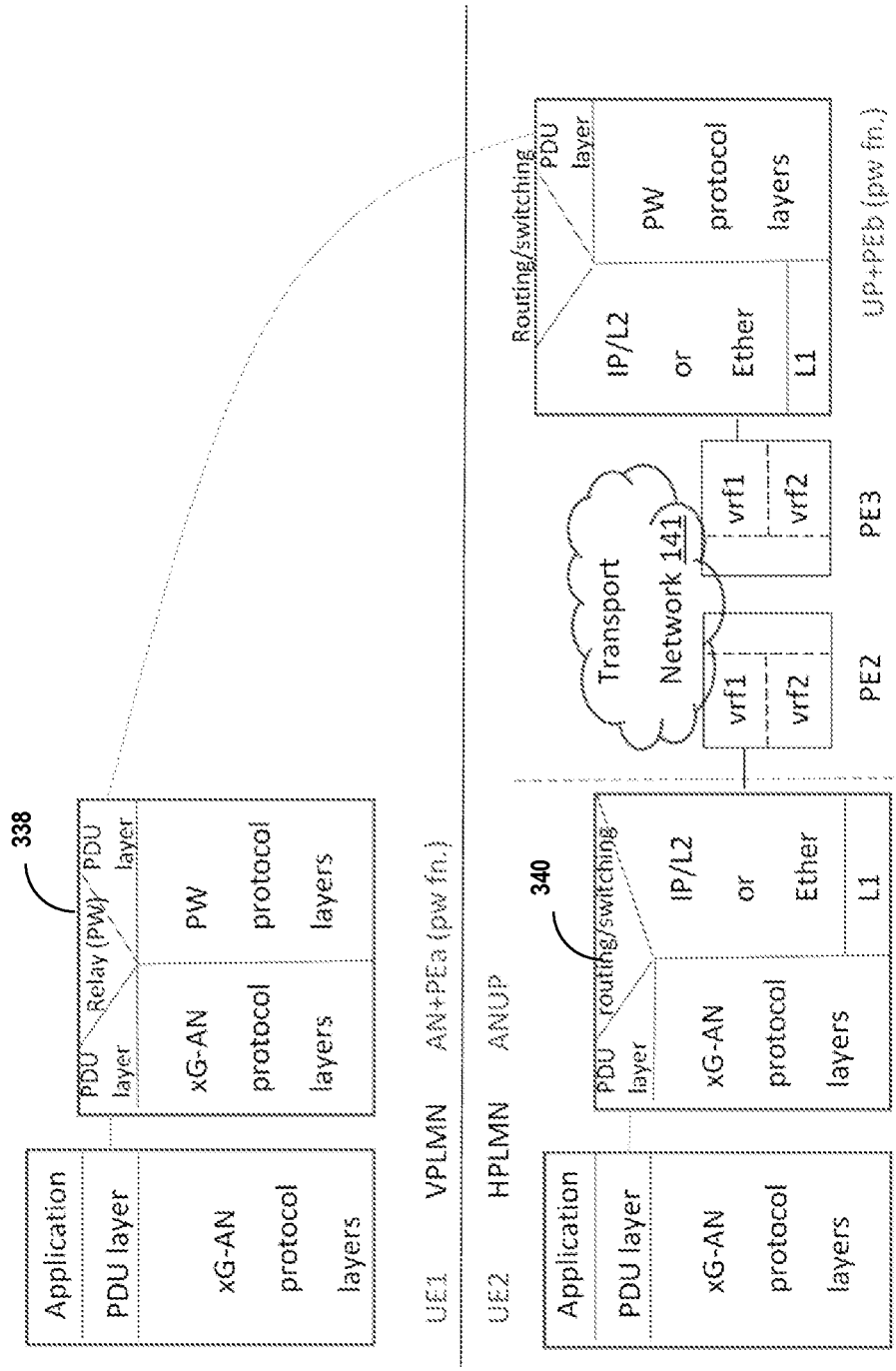
FIG. 6 depicts example protocol stacks in Home Routed roaming, according to techniques of this disclosure.

FIG. 5 depicts the Network Reference Model for Pseudo Wire Emulation according to RFC 3985. This model can be mapped to the mobile user plane architecture implemented and deployed according to techniques described in this disclosure. FIG. 6 depicts example protocol stacks in Home Routed roaming, according to techniques of this disclosure. PE2 & PE3 are for the DN VPN, and PEa & PEb are for the PWs for roaming purposes. In this example depiction, UE1 is roaming while UE2 is not. UE1 connects to an ANUP 338 of a visitor network, denoted as VPLMN, wherein a pseudo wire acts to connect to an ANPU 340 of UE1's home network, denoted as HPLMN.

The following help illustrate the mapping to the mobile user plane architecture:

Customer Edge 1 (CE1) in FIG. 5 corresponds to a roaming UE and Provider Edge 1 (PE1)/AN corresponds to the ANUP 338 in a Visited PLMN (though it does not terminate the PDU session but extends it to a PW).

The radio link between CE1/UE1 and PE1/ANUP 338 is the AC in PW architecture. PDU session is the Emulated Service. Pseudo Wire corresponds to the N3/N9 tunnel in 5G. PSN tunnel corresponds to the UDP tunnel that transports the N3/N9 in 5G.

Provider Edge 2 (PE2) and Customer Edge 2 (CE2) together correspond to the ANUP 340 in HPLMN in the new architecture. It could be viewed that the PE2 provides AN function (with the PW corresponding to the radio link) and CE2 provides the UPF function.

PE1 receives the PDU packet from UE (after decapsulate the SDAP stack), which is treated as PW payload, and sends to PE2 over the PW. PE2 decapsulates the PW encapsulation and exposes the PDU (in like manner that a gNodeB decapsulates the SDAP stack), which is then terminated by CE2 (though PE2 and CE2 are integrated into a single ANUP, in accordance with techniques of this disclosure).

In 5G Home Routed roaming architecture, there is a pair of I-UPFs between the two PLMNs—the N3 tunnel does not extend directly from a VPLMN's AN to a HPLMN's UPF. The same concept also exists in VPN technology—the I-UPFs may function similarly to a pair of ASBRs that provide Option-B inter-AS VPN services.

Alternatively, in some examples, N3/N9 tunneling can still be used instead (though one of the motivations of this new architecture is to remove the N3/N9 tunneling so this is only an alternative embodiment, if N3/N9 tunneling must be used).

Virtual Mobile Network Operator (VMNO) and UP for a Cluster of ANs

It is possible that an operator may not be able to (or may not desire to) fully distribute the UPF to the access nodes. The operator may instead deploy a more centralized UPF for a cluster of access nodes in proximity.

An operator may support "Full VMNOs," which only lack their own radio networks. In that case, tunneling from AN/ANUP to the mobile virtual network operator (MVNO)'s UP/UPF is also needed. Like the roaming case, Pseudo Wires (or even N3/N9) can be used for these scenarios as described in the preceding paragraphs.

Figure 7:
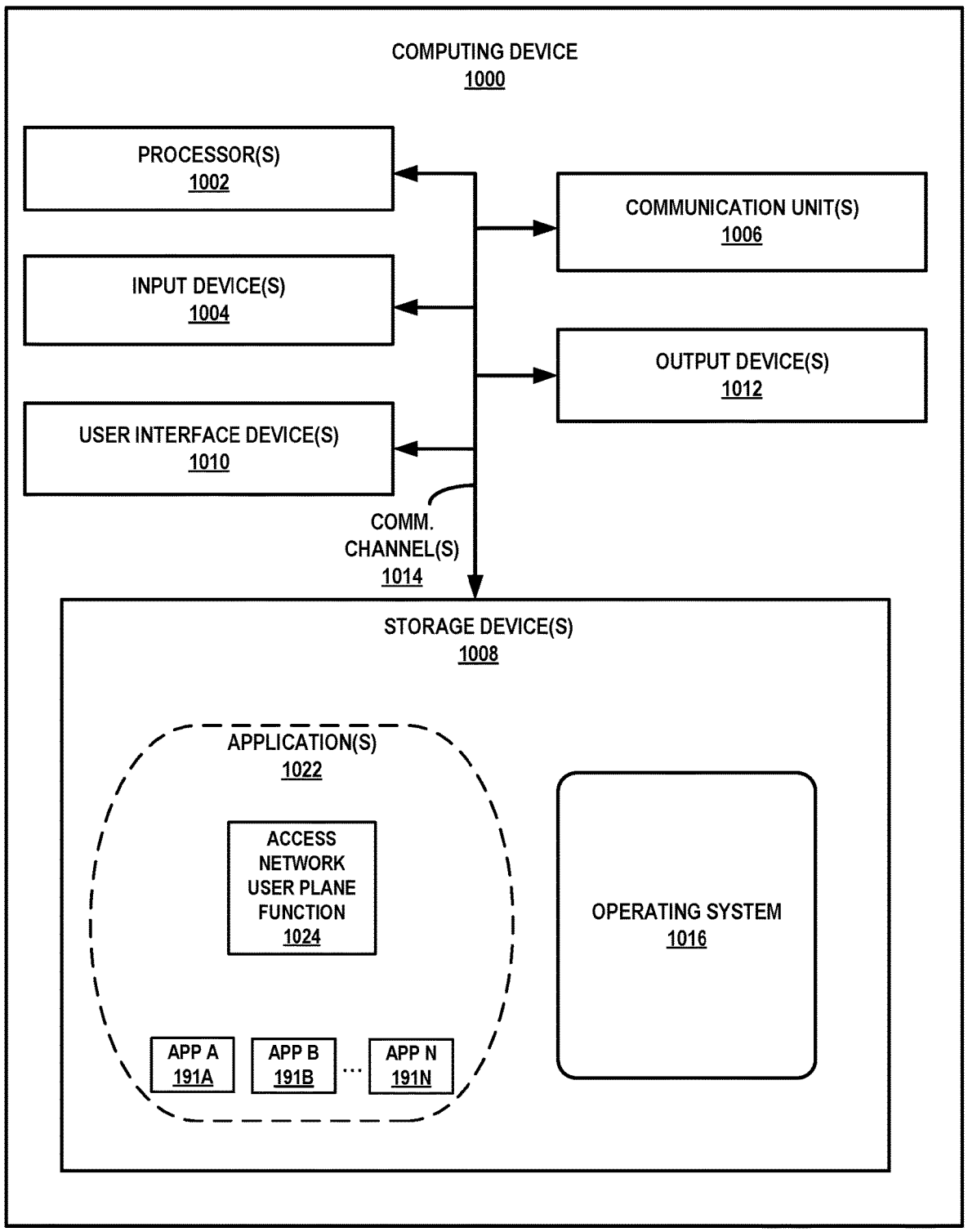
FIG. 7 is a block diagram illustrating details of one example of an ANUP computing device that operates in accordance with one or more techniques of the present disclosure.

FIG. 7 is a block diagram illustrating details of one example of a computing device that operates in accordance with one or more techniques of the present disclosure. FIG. 7 may illustrate a particular example of a server or other computing device 1000 that includes one or more processor(s) 1002 for executing any one or more of access network user plane function (ANUP) 1024, applications 191A-191N, other applications 1022, or any other system, application, node software, or module described herein. Other examples of computing device 1000 may be used in other instances. Although shown in FIG. 7 as a stand-alone computing device 1000 for purposes of example, computing device 1000 may be any component or system that includes one or more processors or other suitable computing environment for executing software instructions and, for example, need not necessarily include one or more elements shown in FIG. 7 (e.g., communication units 1006; and in some examples components such as storage device(s) 1008 may not be co-located or in the same chassis as other components). As shown in the specific example of FIG. 7, computing device 1000 includes one or more processors 1002, one or more input devices 1004, one or more communication units 1006, one or more output devices 1012, one or more storage devices 1008, and user interface (UI) device 1010. Computing device 1000, in one example, further includes one or more applications 1022 and operating system 1016 that are executable by computing device 1000. Each of components 1002, 1004, 1006, 1008, 1010, and 1012 are coupled (physically, communicatively, and/or operatively) for inter-component communications. In some examples, communication channels 1014 may include a system bus, a network connection, an inter-process communication data structure, a message bus, or any other method for communicating data. As one example, components 1002, 1004, 1006, 1008, 1010, and 1012 may be coupled by one or more communication channels 1014.

Processors 1002, in one example, are configured to implement functionality and/or process instructions for execution within computing device 1000. For example, processors 1002 may be processing circuitry capable of processing instructions stored in storage device 1008. Examples of processors 1002 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1008 may be configured to store information within computing device 1000 during operation. Storage device 1008, in some examples, is described as a computer-readable storage medium. In some examples, storage device 1008 is a temporary memory, meaning that a primary purpose of storage device 1008 is not long-term storage. Storage device 1008, in some examples, is described as a volatile memory, meaning that storage device 1008 does not maintain stored contents when the computer is turned off. Examples of volatile memories include random access memories (RAM), dynamic random access memories (DRAM), static random access memories (SRAM), and other forms of volatile memories known in the art. In some examples, storage device 1008 is used to store program instructions for execution by processors 1002. Storage device 1008, in one example, is used by software or applications running on computing device 1000 to temporarily store information during program execution.

Storage devices 1008, in some examples, also include one or more computer-readable storage media. Storage devices 1008 may be configured to store larger amounts of information than volatile memory. Storage devices 1008 may further be configured for long-term storage of information. In some examples, storage devices 1008 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1000, in some examples, also includes one or more communication units 1006. Computing device 1000, in one example, utilizes communication units 1006 to communicate with external devices via one or more networks, such as one or more wired/wireless/mobile networks. Communication units 1006 may include a network interface card, such as an Ethernet card, an optical transceiver, a radio frequency transceiver, or any other type of device that can send and receive information. In some examples, computing device 1000 uses communication unit 1006 to communicate with an external device.

Computing device 1000, in one example, also includes one or more user interface devices 1010. User interface devices 1010, in some examples, are configured to receive input from a user through tactile, audio, or video feedback. Examples of user interface devices(s) 1010 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1012 may also be included in computing device 1000. Output device 1012, in some examples, is configured to provide output to a user using tactile, audio, or video stimuli. Output device 1012, in one example, includes a presence-sensitive display, a sound card, a video graphics adapter card, or any other type of device for converting a signal into an appropriate form understandable to humans or machines. Additional examples of output device 1012 include a speaker, a cathode ray tube (CRT) monitor, a liquid crystal display (LCD), or any other type of device that can generate intelligible output to a user.

Computing device 1000 may include operating system 1016. Operating system 1016, in some examples, controls the operation of components of computing device 1000. For example, operating system 1016, in one example, facilitates the communication of one or more applications 1022 including ANUP 302 with processors 1002, communication unit 1006, storage device 1008, input device 1004, user interface devices 1010, and output device 1012.

Applications 1022 may also include program instructions and/or data that are executable by computing device 1000. Example applications 1022 executable by computing device 1000 may include application and/or other software to implement capabilities described above. For example, applications 1022 can include applications 191A-191N to implement services.

Access network user plane function 1024 is a network function that implements both a 3GPP access network protocol layer stack (e.g., xG-AN protocol layers) to support a PDU layer and an IETF network stack and performs routing/switching between the PDU layer and the IETF stacks. In some cases, the PDU layer may be IPv4/IPv6 or Ethernet. Access network user plane function 1024 may be implemented and deployed as a virtual machine, a bare metal server application, a process, or a container, for example. As such, access network user plane function 1024 may be a virtualized network function (VNF) or cloud-native/containerized network function (CNF) that is deployed to computing device 1000.

Computing device 1000 may represent an example instance of any of the ANUP devices or systems described in this disclosure, such as ANUP 302, ANUPs 320, or ANUP 340. Depending on the context in which the term is used in this disclosure, "access network user plane function" may refer to a software-implemented network function or to a hardware computing device, system, appliance, or other system that implemented an access network user plane function. This is usage is understood to those of skill in the art of mobile networks. The phrase "access network user plane" can be used herein as shorthand for or as an abbreviation of access network user plane function.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. An access network user plane function (ANUP) for a mobile network, the ANUP comprising processing circuitry and configured to:
   execute an access network protocol to implement a connection with a user equipment (UE);
   implement, based on session data received from a control plane function of a mobile core network for the mobile network, an interface with a data network;
   implement, with the mobile core network, a common interface that provides a combination of an N2 interface and an N4 interface; and
   route or switch packets between the connection with the UE and the interface with the data network.

2. The ANUP of claim 1, wherein the ANUP does not implement an N3 interface.

3. The ANUP of claim 1, wherein the control plane function comprises one of an Access Mobility Management Function (AMF) or a Session Management Function (SMF).

4. The ANUP of claim 1, wherein the access network protocol comprises one of Radio Link Control (RLC), Packet Data Convergence Protocol (PDCP), and Service Data Adaption Protocol (SDAP).

5. The ANUP of claim 1,
   wherein the access network protocol is for an access network protocol layer that supports a protocol data unit (PDU) layer between the connected UE and the ANUP, and
   wherein to route or switch packets between the connection with the UE and the interface with the data network, the ANUP is configured to route IP packets, switch Ethernet frames, or relay unstructured PDU data.

6. The ANUP of claim 1, wherein a single server includes the processing circuitry.

7. The ANUP of claim 1, wherein the ANUP is configured to advertise to the data network a host route comprising an Internet Protocol address for a connected UE.

8. The ANUP of claim 7, wherein the data network is implemented as an Internet Protocol Virtual Private Network (IP-VPN) or an Ethernet VPN, wherein the ANUP is configured as a customer edge (CE) device connected to a provider edge (PE) device or integrated into the PE device of the IP-VPN or Ethernet VPN.

9. The ANUP of claim 8, wherein the ANUP is configured to use Segment Routing to implement tunneling for the IP-VPN or Ethernet VPN.

10. The ANUP of claim 1, wherein the ANUP is configured to implement a pseudowire across a transport network to transport packet data traffic for cases using a separate access network function and user plane function.

11. The ANUP of claim 10, wherein the ANUP is configured to implement a pseudowire across a transport network between a Visited Public Land Mobile Network (VPLMN) and a Home Public Land Mobile Network (HPLMN) to transport, to the HPLMN, packet data traffic received from a UE connected to the VPLMN.

12. The ANUP of claim 10, wherein the ANUP is configured to implement a pseudowire across a transport network to transport packet data traffic to a network of a Mobile Virtual Network Operator.

13. The ANUP of claim 10, wherein the ANUP is configured to implement a pseudowire across a transport network to transport packet data traffic to a UPF that serves multiple access networks.

14. A mobile network system comprising:
   a mobile core network comprising a control plane function; and
   an access network user plane function (ANUP) for a mobile network, the ANUP configured to:
      execute an access network protocol to implement a connection with a user equipment;
      implement, based on session data received from the control plane function of the mobile core network, an interface with a data network;
      implement, with the mobile core network, a common interface that provides a combination of an N2 interface and an N4 interface; and
      route or switch packets between the connection with the UE and the interface with the data network.

15. A method comprising:
   executing, by an access network user plane function (ANUP) for a mobile network, an access network protocol to implement a connection with a user equipment (UE);
   implementing, by the ANUP, based on session data received from a control plane function of a mobile core network for the mobile network, an interface with a data network;
   implementing, with the mobile core network, a common interface that provides a combination of an N2 interface and an N4 interface; and
   routing or switching, by the ANUP, packets between the connection with the UE and the interface with the data network.

16. The method of claim 15, wherein the ANUP does not implement an N3 interface.

17. The method of claim 15, wherein the access network protocol is for an access network protocol layer that supports a protocol data unit (PDU) layer between the connected UE and the ANUP, and
   wherein to route or switch packets between the connection with the UE and the interface with the data network, the ANUP is configured to route IP packets, switch Ethernet frames, or relay unstructured PDU data.

18. The method of claim 15, wherein the ANUP is a first ANUP, the method further comprising:
   in response to a UE newly connecting to the first ANUP and disconnecting from a second ANUP:
      advertising, by the first ANUP to the data network, a first host route for the UE via the first ANUP;
      withdrawing, by the second ANUP from the data network, a second host route for the UE via the second ANUP; and
      using, by nodes in the data network, the first host route to direct traffic for the UE to the first ANUP and not the second route.

19. The method of claim 15, wherein the data network is implemented as an Internet Protocol Virtual Private Network (IP-VPN) or an Ethernet VPN, wherein the ANUP is configured as a customer edge (CE) device connected to a provider edge (PE) device or integrated into a PE device of the IP-VPN or Ethernet VPN.

20. The method of claim 19, further comprising:

using, by the ANUP, Segment Routing to implement tunneling for the IP-VPN or the Ethernet VPN.

* * * * *